Inventors
Thomas B. Correy
Mynard H. Taylor
by Roland G. Anderson
Attorney

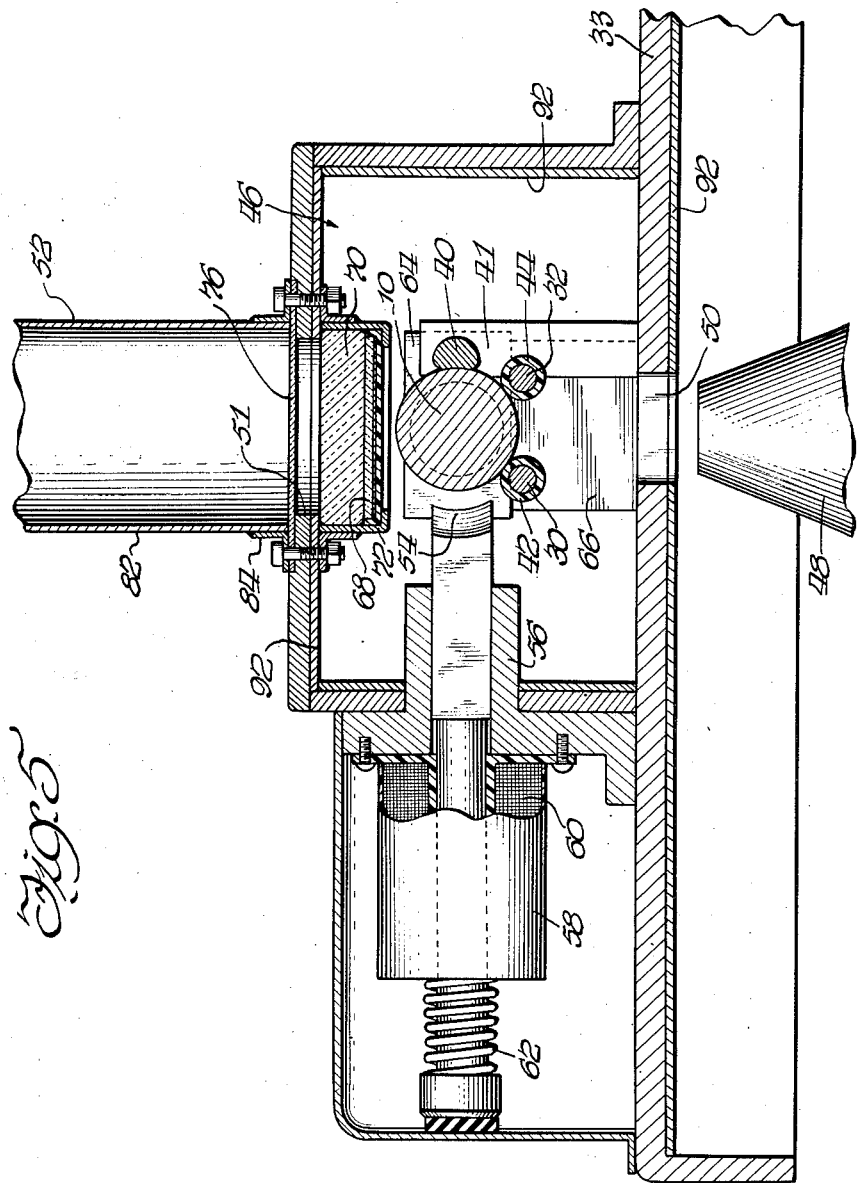

United States Patent Office 2,800,588
Patented July 23, 1957

2,800,588

MARKING FLUOROSCOPE HEAD

Thomas B. Correy and Mynard H. Taylor, Richland, Wash., assignors to the United States of America as represented by the United States Atomic Energy Commission Application January 23, 1956, Serial No. 560,915

6 Claims. (Cl. 250—59)

The present invention relates to apparatus for scribing markings on metal objects, in particular it relates to fluoroscopic marking devices suitable for correlating external markings on a metal object with internal structure of the object.

In certain manufacturing and industrial processing arts it is necessary to encase a substance within a metallurgically sealed metallic envelope or container during some steps of a process, and later after processing, recover the substance from the interior of the container. If the substance is costly or dangerous to personnel, the recovery steps must be carried out with great care to insure a minimum loss from dispersal of the substance during its removal from the metallic envelope or container. One technique for recovery of a substance incased within a metal container employs mechanical cropping or shearing of portions of the outer metallic covering. However, the shearing operation must be carried out with considerable precision and care to avoid dispersal and loss of the substance by abrupt and untimely rupture of the container. It has been found that if the container is carefully marked on its exterior surfaces to indicate the location of the internal cavity wherein the processed substance is positioned, conventional metal working methods may be used to carefully strip the protective metallic envelope away without abruptly opening the internal cavity and risking dispersal of the substance held therein.

One object of the present invention is to provide a metal working device for inscribing lines on the exterior of a metallic object in relationship to internal features within the object.

Another object of the invention is to provide a fluoroscopic device, safe for continuous and repeated operation by an operator, for marking guide lines on a metal object in relationship to the internal structure of the object.

These and other objects and advantages of our invention will be apparent from the following illustrations, specification and claims.

Our invention, briefly, is an apparatus for marking the projected contour of an internal cavity upon the external surface of a hollow object comprising in combination means for obtaining a fluoroscopic X-ray image, a movable carriage disposed to move the object into view through the image means, a backing means attached to one side of the carriage, movable with the carriage and adapted to hold the object rigidly and free of lateral movement with respect to the carriage, a broad bladed stylus mounted to be reciprocally movable, the blade being adapted to fit the exterior surface contour of the object, disposed to be viewed through the image means, and further disposed to contact the object positioned on the carriage on the side opposite the backing means, the whole apparatus being encased in suitable shielding structures to minimize radiation hazards to operating personnel wherewith the contour of the internal cavity of the object may be scribed on the exterior surface of the object by viewing the object through the image means while it is being positioned with respect to the stylus and actuating the stylus to cause appropriate contact thereof with the surface of the object.

A favorite embodiment of our invention is illustrated in the accompanying drawings in which Fig. 1 is a partly sectioned isometric view of one embodiment of our apparatus;

Fig. 5 is a cross sectional view of the apparatus shown in Fig. 1 taken along the plane of line 5—5 of Fig. 1.

Figure 1:
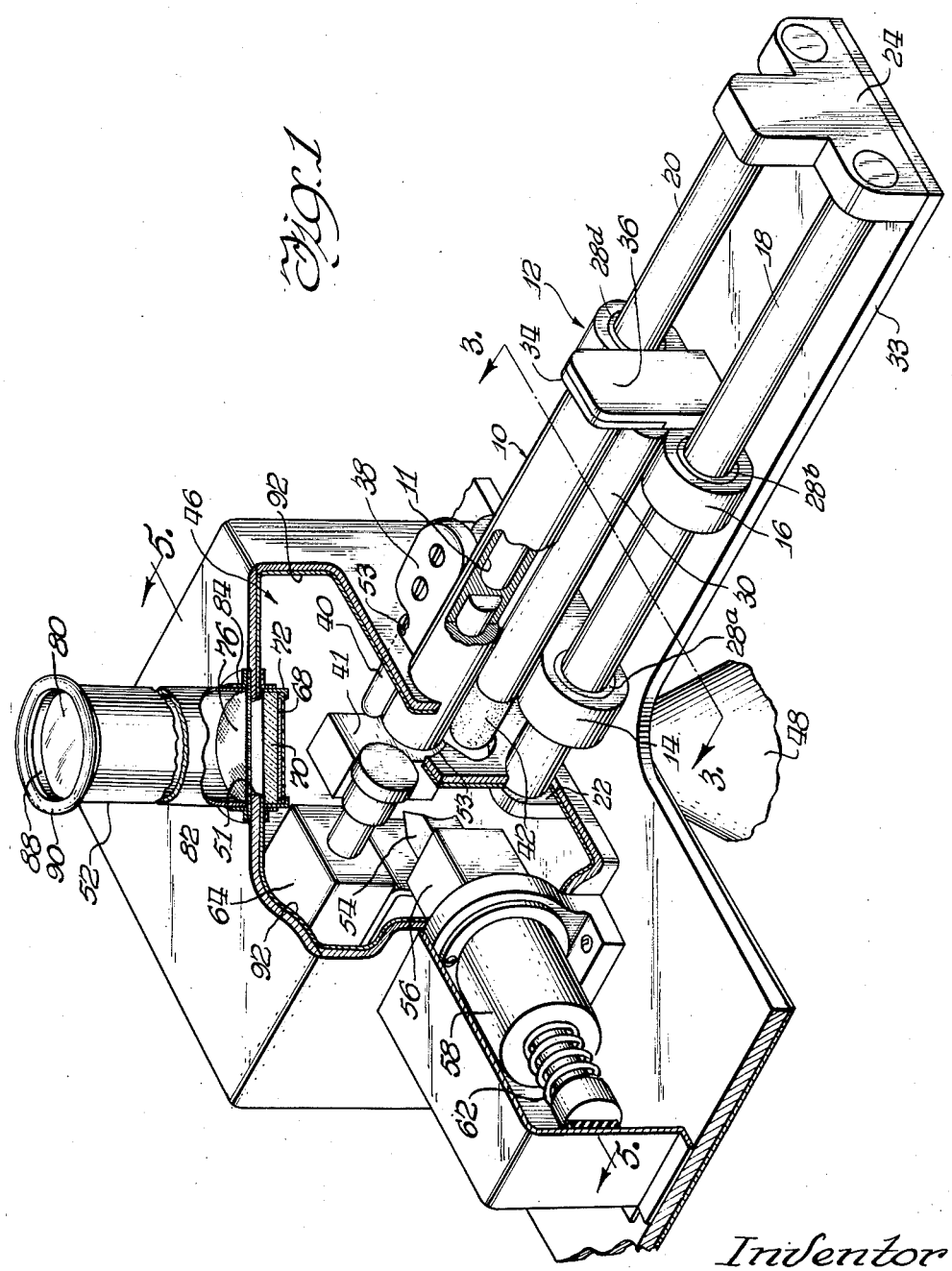

Referring to the drawings 10 is a cylindrical metal object on which it is desired to have guide lines marked about its outer surface to indicate the contours of an internal cavity 11. The object 10 is carried by a carriage assembly 12. The carriage 12 is supported on and rides upon two bushing holders, a forward holder 14 and a rear holder 16. The bushing holders 14 and 16 move along guide rods 18 and 20 which in turn are held fixed in spaced relationship by a forward brace 22 and a rear brace 24 disposed one at either end of the guide rods 18 and 20. The bushing holders 14 and 16 are adapted to slide smoothly along the guide rods 18 and 20 by means of sleevelike bushings 28a, 28b, 28c, and 28d, which move with minimal friction along the guide rods 18 and 20, and which are mounted in the bushing holders 14 and 16. The bushing holders 14 and 16 are connected together by means of elongated cylindrical ways 30 and 32 which are rigidly secured to the bushing holders and which extend parallel with the guide rods 18 and 20 and which also serve to hold the object 10 in position on the carriage. The ways move with the bushing holders 14 and 16 along the guide rods 18 and 20. The outermost brace 24 is mounted directly onto a base plate 33 which is comprised of a ⅜ inch thick steel plate and forms a platform on which the whole apparatus is mounted. The brace 22 is mounted on the plate 33 but within a chamber 46 which rests on the plate 33 and which will be described in detail below. The carriage 12 is moved by a handle 36 which is secured to the rear bushing holder 16 and moves axially along the guide rods 18 and 20 with the carriage assembly 12. A rubber bumper 34 is provided on the face of the handle for contact with the object 10. Bushing holder 14 is provided on one side with a backing bracket 38 which extends upward from the bushing holder toward the position of the object 10. The backing bracket has a contour 39 which is adapted to conform to the exterior surface of the object 10 and serves to hold the object rigid against lateral movement with respect to the ways 30 and 32. The backing bracket 38 supports still another structure which serves as a stop 40 designed to limit the axial movement of the carriage along the guide rods. The stop 40 is so positioned that it contacts a bumper 41 when the carriage 12 has been moved to the extreme extent of its travel toward brace 22. The ends 42 and 44 of the ways 30 and 32 respectively are coated with polyethylene plastic compound; the coating, as is shown in the drawings, extends partway down the sides of the ways 30 and 32 and serves to provide a surface with an increased coefficient of friction to further assist in holding the object 10 in place on the ways 30 and 32.

Figure 2:
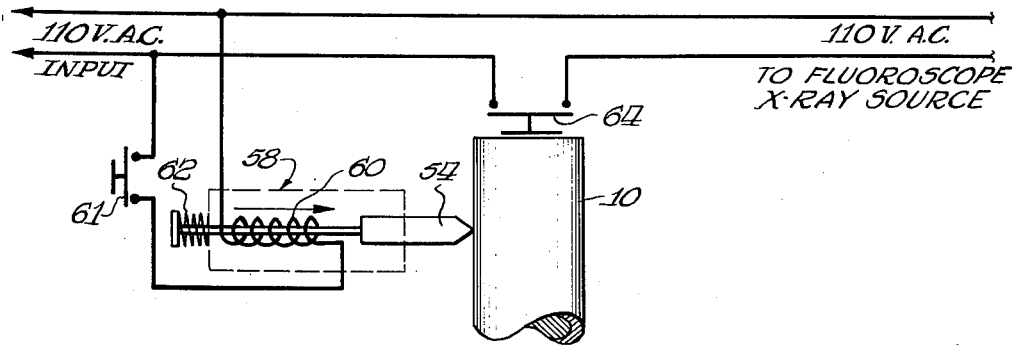
Fig. 2 is a schematic diagram of an electrical circuit utilized in our invention.
Figure 3:
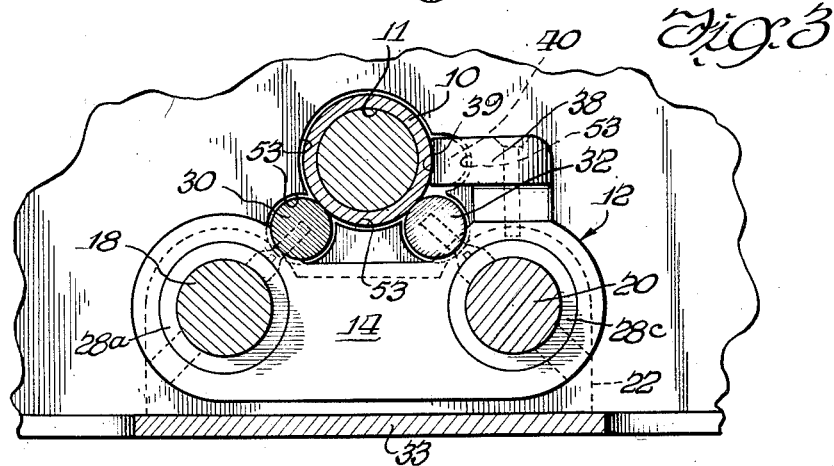
Fig. 3 is a cross sectional view of the apparatus shown in Fig. 1 taken along the plane of line 3—3 of Fig. 1.
Figure 4:
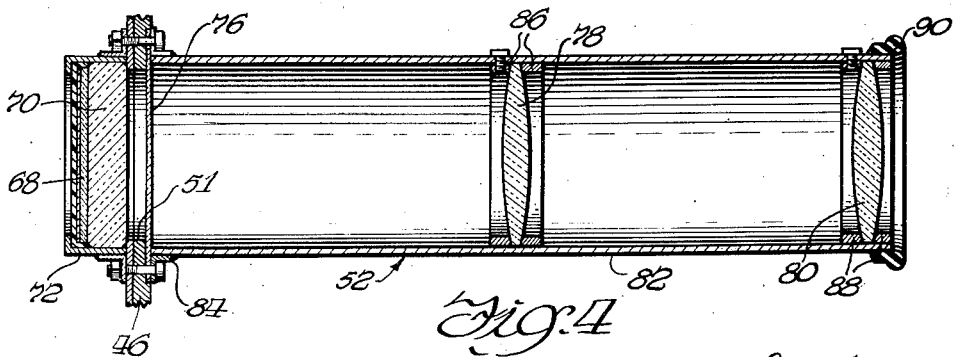
Fig. 4 is an enlarged sectional view of the optical system shown in Fig. 1.

A heavy metal housing having an internal chamber 46 is mounted on the base plate 32 and is provided with three apertures. One aperture 50 is adapted to permit a collimated X-ray beam originating in an industrial X-ray source 48 to pass through the base plate 33 into the interior of the chamber. The X-ray source 48 is positioned on the side of the plate 33 opposite to where the carriage 12 and the metal chamber 46 are mounted. A second aperture 51, aligned with the aperture 50 on the opposite side of the chamber 46, is adapted to accommodate an optical viewing assembly 52, described in detail below; the viewing assembly is adapted to permit fluoroscopic observation of X-ray images of all structures placed within the chamber 46 between it and the X-ray beam source 48. The third aperture 53 in the chamber 46 is located in a chamber wall disposed at right angles to the parallel walls in which apertures 50 and 51 are located. The aperture 53 is adapted to accommodate the passage of a portion of the carriage assembly 12 into and out of the chamber while the object 10 is positioned on the ways 30 and 32; moreover, the contour of the aperture 53 is adapted to conform within a small tolerance to the contour of a lateral section cut through the carriage 12 carrying the object 10. The contour of aperture 53 is illustrated in the drawings in both Figs. 1 and 3. When the carriage assembly 12 is inserted into the chamber 46 through the aperture 53, it substantially completely fills the aperture, hence no direct passages through the chamber wall are, under this circumstance, left open to allow the escape of X-ray radiation out of the chamber 46. Within the chamber 46 there is a reciprocally mounted broad bladed knife or stylus 54 mounted on a bracket 56 and adapted to be actuated by a solenoid 58. It is positioned within the chamber so that when the carriage 12 is inserted into the chamber 12 the stylus 54 will be adjacent to the carriage, at one side thereof and disposed to move laterally across the carriage ways 30, 32 toward the backing bracket 38 carried on the bushing holder 14. The stylus 54 is wedge-shaped; the cutting edge is further modified to conform to the contour of the outer surface of the object 10. The stylus 54 is so mounted that when the carriage is inserted into the chamber the stylus will be aligned with the backing bracket 38 and upon forward movement of the stylus it will contact the object 10 which will then be held firmly between the backing bracket 38 and the cutting edge of the stylus 54. Forward movement of the stylus is controlled by a solenoid 58 which is comprised of an electromagnetic coil 60 adapted to thrust the stylus 54 forward with considerable force when the coil is energized. The solenoid circuit is shown in Fig. 2; in addition to the coil 60 it includes a switch 61 in series between the coil 60 and the 115 volt A. C. mains. When the coil is deenergized by opening the switch 61, a spring 62 retracts the stylus 54 to a position remote from the object 10.

A microswitch 64 is mounted on a bracket 66 within the chamber 46 and is positioned in alignment axially with the movement of the object 10 on the carriage 12. The microswitch 64 is disposed to be readily contacted by the extreme end of the object 10 when it is thrust into the chamber 46. The switch 64 is connected in series between the 115 volt mains and the X-ray source and is adapted to close the X-ray power source circuit only when held in a closed position by contact with the end of the object 10; with such an arrangement, the X-ray source cannot be readily energized without the insertion of the object 10 properly positioned on the carriage 12, into the chamber 46. Such an arrangement minimizes the radiation hazard to personnel using the apparatus by reason of the fact that the X-ray source can not be powered unless the carriage 12 is inserted through the aperture 53 into the chamber 46, and as is indicated above, serves in the inserted position to assist in shielding operating personnel from X-ray radiation.

Mounted in alignment with the aperture 50 but on opposite sides of the chamber 46 is an optical means 52 comprised of a fluorescent screen 68 which is disposed within the interior of the chamber 46. A lead glass shield 70 is also disposed within the chamber 46. Both the fluorescent screen and the lead glass shield are held in a flanged retainer 72 immediately adjacent and in alignment with the aperture 51 in the wall of the chamber 46. The optical means 52 further comprises a reticulated screen 76, an objective lens 78, and an eyepiece 80, all mounted in a tube 82 which is held on the exterior of the chamber 46 by means of a flanged bracket 84. The objective lens 78 is held within the tube 82 by means of retainer rings 86, and the eyepiece lens 80 is held in position in the tube 82 by means of retainer rings 88. The end of the tube 82 is protected by a rubber eyeguard 90. The fluoroscope screen 68 may be a 2$\frac{3}{32}$" Patterson type B-2 screen with a Bakelite back. Such screens are available commercially from numerous vendors of X-ray and fluoroscope equipment. The chamber 46 serves primarily as a shield to contain the X-ray radiation. It is composed of a lead sheath lining 92 which extends throughout the interior of the chamber except the apertures 50, 51, and 53. The exterior of the chamber 46 is constructed of metal; steel and brass have been found to be very satisfactory material for the chamber 46.

The apparatus is prepared for use by withdrawing the carriage assembly 12 from the interior of the chamber 46 and placing an object 10 on the carriage ways 30 and 32. The carriage assembly is then pushed into the interior of the chamber 48 by means of the carriage handle 36. When the carriage assembly 12 is inserted sufficiently far into the chamber, the end of the object 10 contacts the switch 64 and closes the said switch. Therewith the power circuit of X-ray source 50 is energized, and the X-ray source sends an X-ray beam into the chamber 46 through aperture 50. The operator peers through the optical means 52 and views the projected X-ray shadow image on the fluorescent screen 68 located within the chamber 46. The operator is protected from the direct X-ray radiation by the lead sheath 92 within the chamber 46 the lead glass shield 70 mounted within the optical means 52 and the other measures recited above adapted to prevent the escape of X-ray radiation from the interior of the chamber 46. The X-ray beam is adapted to penetrate the object 10 and reveal the contours of the internal cavity 11 therein. The operator, moreover, can see the image of the cutting edge of the stylus 54 on the fluoroscope screen, and by moving the object 10 on the carriage 12 the operator can align the contours of the cavity 11 opposite the cutting edge of the stylus 54, whereupon he can energize the solenoid 58 by closing the switch 61 which closes the solenoid circuit and thrusts the stylus 54 forward to contact the object 10 and scribe a mark thereon. The grid of the reticulated screen 76 is readily seen by the operator through the optical means 52 and further assists him in aligning the object 10 with the cutting edge of the stylus. After marking the object 10 as desired, the operator withdraws the object from the interior of the chamber by withdrawing the carriage 12 with the marked object 10 resting thereon from the interior of the chamber. Upon releasing the pressure of the object 10 against the switch 64 the X-ray power circuit is opened and the beam is cut off. Once the carriage is withdrawn from the chamber 46 the object may be readily recovered and is now scribed with markings indicative of the projection of the internal cavity 11 on the exterior surface of the object.

The foregoing specification and drawings are intended to be merely illustrative of the invention; the scope of the invention is to be limited only by the following claims.

What is claimed is:

1. An apparatus for scribing metal objects comprising a metal shield having an internal chamber, means for directing an X-ray beam into the chamber, a movable carriage for moving objects into and out of the chamber, a scribing tool and means for actuating the tool mounted within the chamber and disposed adjacent to the carriage when the carriage is moved into the chamber, a fluoroscope screen disposed within the chamber to receive shadow images of the tool and object, and optical means for viewing the screen from outside the chamber.

2. An apparatus for marking the projected contour of an internal cavity upon the external surface of a hollow object comprising a fluorescent screen, means for directing a collimated X-ray beam onto the screen, guide rods and ways mounted in spaced relationship between the screen and X-ray means, a carriage adapted to move the object axially along the guide rods and ways and into alignment with the screen, a backing means mounted to a first side of the carriage, a wedge-shaped stylus movably mounted in spaced relationship between the screen and the X-ray means and adapted to move laterally across the ways toward the said first side of the carriage, whereby the external surface of the object may be marked to indicate the contour of the internal cavity therein by positioning the object on the carriage with respect to the stylus and moving the stylus to contact the exterior surface of the object while viewing the stylus and the object on the screen.

3. An apparatus for marking the projected contour of an internal cavity upon the external surface of a hollow object comprising in combination means for obtaining a fluoroscope X-ray image, a broad bladed stylus mounted to be reciprocally movable, the blade being adapted to fit the exterior surface contour of the object and disposed to be readily viewed in the X-ray image means, a movable carriage disposed to move the object into view through the image means, the carriage having a backing means attached to one side thereof movable with the carriage, and adapted to conform to the exterior surface contour of the object, and further adapted to hold the object rigid and free of lateral movement with respect to the carriage, the backing means being on the side of the carriage opposite the stylus when the carriage is positioned in view of the image means whereby the object may be marked to indicate internal contours thereof by moving the carriage to position the object carried thereon opposite the stylus while both the object and the stylus are disposed within view of the image means and moving the stylus to contact the object.

4. An apparatus for marking the projected contour of an internal cavity upon the external surface of a hollow object comprising a housing having an interior chamber, means for directing a collimated X-ray beam into the interior of the chamber, a fluorescent screen mounted within the chamber, adapted to be viewed from outside the chamber, and further adapted to receive a shadow image of any object disposed in the X-ray beam within the housing, a movably mounted wedge-shaped stylus mounted within the housing and adapted to be viewed on the screen, the said stylus having a recessed contour along the sharpened edge adapted to conform to the contour of the external surface of the object, a carriage adapted to move the object into the chamber and further provided with a braced backing means adapted to hold the object rigidly in relationship to the stylus, and remote means adapted to move the stylus laterally of the carriage whereby a shadow image of the internal cavity of the object and the stylus may be viewed on the screen, and the object may be positioned with respect to the stylus by movement of the carriage, wherewith the object may be marked as desired on its exterior surface by movement of the stylus.

5. An apparatus for marking the projection of an internal cavity upon the exterior surface of a hollow object comprising a heavy metal housing having an interior chamber, means for directing a collimated X-ray beam into the interior of the chamber, an adjustable carriage adapted to move a portion of the object into and out of the interior of the chamber, the carriage being further adapted to position the object in the chamber within the X-ray beam, a fluorescent screen mounted within the chamber and adapted to be viewed from outside the chamber and further disposed to receive a shadow image of the object on the carriage during illumination of the object by the X-ray beam, a stylus mounted within the chamber and disposed to be adjacent the carriage when the carriage is inserted into the interior of the chamber, means to actuate the stylus, and optical means for viewing from the exterior of the chamber images on the fluoroscope screen whereby the object may be marked to indicate the internal cavity therein by positioning the object with respect to the stylus by moving the carriage while viewing the object and the stylus on the screen and actuating the stylus.

6. An apparatus for marking objects comprising a heavy metal housing having an interior chamber, means for directing a collimated X-ray beam into the interior of the housing, an adjustable carriage adapted to move the object into and out of the interior of the housing, a backing means attached to one side of and movable with the carriage, and adapted to fit the contour of the object and to hold the object rigid and free of lateral movement with respect to the carriage, a fluorescent screen mounted within the housing and disposed to receive a shadow image of the object on the carriage during illumination by the X-ray beam, a broad bladed stylus adapted to conform to the contour of the object disposed adjacent the carriage on the side opposite the backing means and adapted to be viewed on the screen, means to actuate the stylus mounted adjacent the carriage and within the housing, and optical means for viewing the object and the stylus on the fluoroscope screen.

References Cited in the file of this patent
UNITED STATES PATENTS
720,599   Moritz _____ Feb. 17, 1903